(12) United States Patent
Park et al.

(10) Patent No.: US 9,178,191 B2
(45) Date of Patent: Nov. 3, 2015

(54) BATTERY MODULE

(75) Inventors: Shi-Dong Park, Yongin-si (KR);
Tae-Yong Kim, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 1249 days.

(21) Appl. No.: 13/048,717

(22) Filed: Mar. 15, 2011

(65) Prior Publication Data

US 2012/0114999 A1    May 10, 2012

(30) Foreign Application Priority Data

Nov. 5, 2010  (KR) .................. 10-2010-0109806

(51) Int. Cl.
*H01M 2/04* (2006.01)
*H01M 2/10* (2006.01)
*H01M 2/12* (2006.01)

(52) U.S. Cl.
CPC .......... *H01M 2/0434* (2013.01); *H01M 2/1094* (2013.01); *H01M 2/1061* (2013.01); *H01M 2/1077* (2013.01); *H01M 2/1241* (2013.01)

(58) Field of Classification Search
None
See application file for complete search history.

(56) References Cited

U.S. PATENT DOCUMENTS 7,638,234 B2    12/2009    Naito et al.

FOREIGN PATENT DOCUMENTS

| JP | 09-283103 | 10/1997 |
|---|---|---|
| JP | 2004-319355 | 11/2004 |
| JP | 2008-152371 A | 7/2008 |
| JP | 2008-287987 A | 11/2008 |
| KR | 10-2008-0087193 | 10/2008 |
| KR | 10-2009-0011898 | 2/2009 |
| KR | 10-2010-0041442 A | 4/2010 |

OTHER PUBLICATIONS

KIPO Office action dated Feb. 29, 2012, for Korean priority Patent application 10-2010-0109806, 5 pages.
Patent Abstracts of Japan, and English machine translation of Japanese Publication 9-283103, listed above, 6 pages, Oct. 31, 1997.
Patent Abstracts of Japan, and English machine translation of Japanese Publication 2004-319355, listed above, 8 pages, Nov. 11, 2004.

*Primary Examiner* — Sarah A Slifka
(74) *Attorney, Agent, or Firm* — Christie, Parker & Hale, LLP

(57) ABSTRACT

A battery module according to one aspect of the present invention includes: a plurality of rechargeable batteries; a housing configured to house the plurality of rechargeable batteries and having a first fastening portion; a cover configured to couple to the housing and having a second fastening portion configured to couple to the first fastening portion by a tight fitting; and an elastic member configured to fit between the first and second fastening portions.

17 Claims, 9 Drawing Sheets

BATTERY MODULE

CROSS-REFERENCE TO RELATED APPLICATION

This application claims priority to and the benefit of Korean Patent Application No. 10-2010-0109806, filed in the Korean Intellectual Property Office on Nov. 5, 2010, the entire content of which is incorporated herein by reference.

BACKGROUND

1. Field

The described technology relates to a battery module. More particularly, the described technology relates generally to a battery module having an improved housing structure.

2. Description of Related Art

A rechargeable battery differs from a primary battery in that it can be repeatedly charged and discharged, while the latter makes the irreversible conversion of chemical to electrical energy. The low-capacity rechargeable battery is used as the power supply for small electronic devices, such as cellular phones, notebook computers and camcorders, while the high-capacity rechargeable battery is used as the power supply for driving motors in hybrid vehicles and the like.

Recently, a high power rechargeable battery that includes a non-aqueous electrolyte having a high energy density has been developed, and is constituted by a large capacity rechargeable battery in which a plurality of rechargeable batteries are coupled in series in order to use it to drive devices requiring a large amount of power, for example, motors such as for electric vehicles.

In addition, a large capacity rechargeable battery generally includes a plurality of rechargeable batteries that are coupled in series, and the rechargeable battery may be formed to have cylindrical shapes or angular prismatic shapes. The rechargeable batteries are installed in a housing and thus the housing is sealed to prevent or block external foreign matter from entering thereinto. However, it is impossible to completely seal the housing because a cover is detachably formed for maintenance of the housing.

An external short circuit may be caused when the external foreign matter such as water enters the housing, and instantaneous current flow may cause the rechargeable batteries to explode or catch fire.

The above information disclosed in this Background section is only for enhancement of understanding of the background of the described technology and therefore it may contain information that does not form the prior art that is already known in this country to a person of ordinary skill in the art.

SUMMARY

Aspects of embodiments of the present invention are directed toward a battery module with improved safety.

A battery module according to one embodiment of the present invention includes: a plurality of rechargeable batteries; a housing configured to house the plurality of rechargeable batteries and having a first fastening portion; a cover configured to couple to the housing and having a second fastening portion configured to couple to the first fastening portion by a tight fitting; and an elastic member configured to fit between the first and second fastening portions.

The first fastening portion may be formed in the shape of a protrusion along an upper side of a wall body of the housing, the second fastening portion may be formed in the shape of a groove, and the first fastening portion may have a first inclined side inclined to the upper side of the wall body.

The second fastening portion may have a second inclined side contacting and inclined to the first inclined side, the second inclined side may have an incline angle that is greater than that of the first inclined side. The elastic member may be configured to be inserted between the first and second inclined sides.

In addition, the first fastening portion may have an inclined side inclined to an inner side of the second fastening portion, the second fastening portion may be formed in the shape of a groove, and a root portion of the first fastening portion may be larger than an entrance portion of the second fastening portion.

The first fastening portion may be formed in the shape of a groove, the second fastening portion may be formed in the shape of a protrusion along an upper side of a wall body of the housing. A cross-section of the second fastening portion may be gradually increased toward the wall body of the housing.

The second fastening portion may have a cross-section that is gradually decreased toward the cover, and the second fastening portion may have an inclined side inclined to an inner side of the first fastening portion. The elastic member may be inserted between the inner side and the inclined side of the first fastening portion and the inclined side of the second fastening portion.

The first fastening portion may be formed along a circumference of the housing, and the second fastening portion may be formed along a circumference of the cover.

The battery module may further include a pressing member configured to press the cover to the housing. The first fastening portion and the second fastening portion may be configured to be coupled to each other by a tight fitting.

The elastic member may include a material selected from the group consisting of natural rubber, silicon, polybutylene terephthalate (PBT), ethylene propylene diene monomer (EPDM), and polyamides.

According to an embodiment, the elastic member is provided between the fastening portions that are coupled to each other by a tight fitting so that the housing can be stably sealed.

DETAILED DESCRIPTION OF THE EMBODIMENTS

Figure 1:
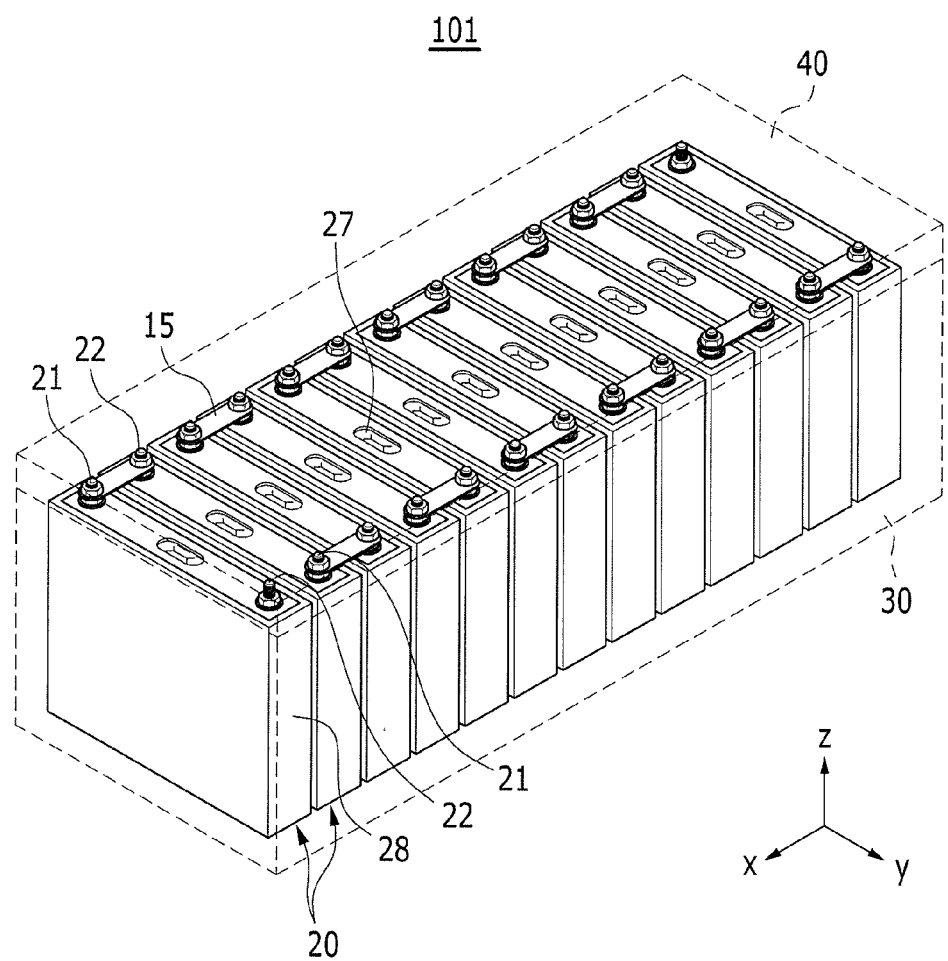
FIG. 1 is a perspective view of a battery module according to a first embodiment of the present invention.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

The drawings and description are to be regarded as illustrative in nature and not restrictive. Further, like reference numerals designate like elements throughout several embodiments. A first embodiment will be representatively described, and the components other than those of the first embodiment will be described in other embodiments.

Throughout this specification and the claims that follow, when it is described that an element is "coupled" to another element, the element may be "directly coupled" to the other element or "electrically coupled" to the other element through one or more third elements. In addition, unless explicitly described to the contrary, the word "comprise" and variations such as "comprises" or "comprising" will be understood to imply the inclusion of stated elements but not the exclusion of any other elements.

Figure 2:
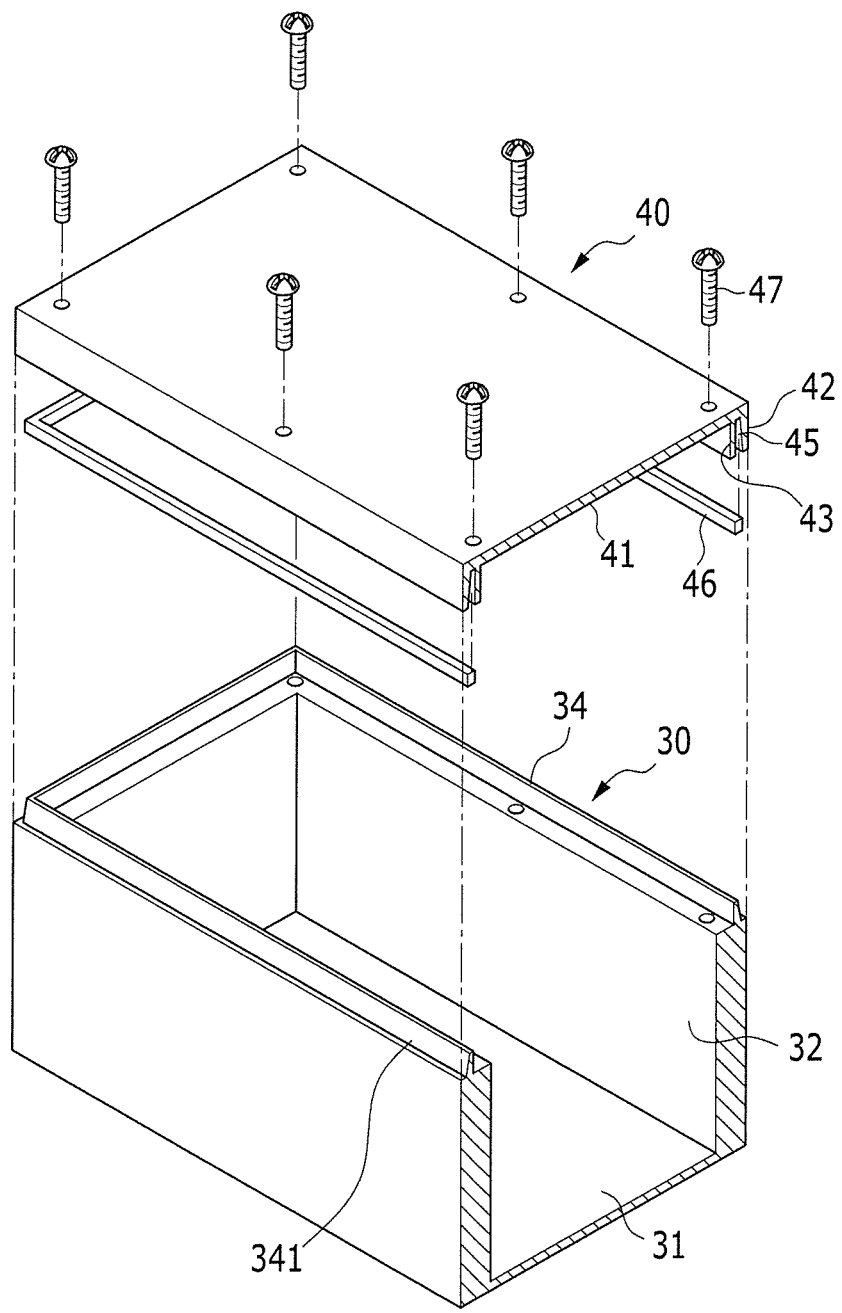
FIG. 2 is an exploded perspective view of a housing and a cover of the battery module according to the first embodiment of FIG. 1.

FIG. 1 is a perspective view of a battery module according to a first embodiment of the present invention, and FIG. 2 is an exploded perspective view of a housing and a cover of the battery module according to the embodiment of FIG. 1.

Referring to FIGS. 1 and 2, a battery module 101 according to the first embodiment includes a plurality of rechargeable batteries 20, a housing 30 in which the plurality of rechargeable batteries 20 are installed, and a cover 40 combined with the housing 30.

Each rechargeable battery 20 of the plurality of rechargeable batteries 20 installed in the housing 30 is exemplarily described as a quadrangle-type lithium ion rechargeable battery. However, without being limited thereto, the present invention may be applicable to various types of batteries such as a lithium polymer battery, a cylindrical battery, and the like.

The rechargeable battery 20 includes a positive terminal 21, a negative terminal 22, and a vent member 27, which is configured to open at a set or predetermined pressure to release gas. Also, the vent member 27 is configured to break when the internal pressure of the rechargeable battery is increased to or above a set or predetermined level to provide a path for releasing an internal gas to the outside atmosphere. The vent member 27 of the rechargeable battery 20 includes a notch that is opened at a set or predetermined pressure to release the gas therethrough.

The rechargeable battery 20 includes a case 28 in which an electrode assembly is installed, and the positive terminal 21 and the negative terminal 22 protrude to the outside of the case 28.

The case 28 is formed in a substantially cubic prismatic shape. In one embodiment, the case 28 is formed from a metal such as aluminum or an aluminum alloy. The positive terminal 21 and the negative terminal 22 are formed in an upper portion of the rechargeable battery 20. The positive terminal 21 is electrically connected with a positive electrode of the electrode assembly and the negative terminal 22 is electrically connected with a negative electrode of the electrode assembly.

The plurality of rechargeable batteries 20 are stacked or layered in parallel with each other in a side direction (x-axis direction of FIG. 1) such that wide front sides of the rechargeable batteries 20 are arranged opposite to each other. Positive and negative electrode terminals 21 and 22 of neighboring rechargeable batteries 20 are arranged in an alternating manner.

The plurality of rechargeable batteries 20 arranged in parallel with each other are electrically coupled in series by a plurality of bus-bars 15. That is, each bus-bar 15 of the plurality of bus bars is provided at a positive electrode terminal 21 of one rechargeable battery 20 and a negative electrode terminal 22 of an adjacent rechargeable battery 20. The bus-bar 15 is formed in a plate shape, and is fixed to the positive and negative electrodes 21 and 22 by a nut secured to each electrode.

As shown in FIG. 2, the housing 30 is formed in a substantially rectangular prismatic shape and defines an inner space. The housing 30 includes a bottom 31 formed in the shape of a rectangular plate and a wall body 32 extended from the bottom 31 to form an upper portion of the housing 30. A first fastening portion 34 is formed protruding from the wall body 32. The first fastening portion 34 is formed in the shape of a protrusion, and is extended circumferentially along the upper edge (upper side) of the wall body 32. The first fastening portion 34 joins the upper edge of the wall body 32 at a root portion (e.g., as one body). A portion of the first fastening portion 34 farthest from the wall body 32 is an end portion.

A first inclined side 341 that is at an incline to the upper side of the wall body 32 forms one side of the first fastening portion 34, such that a cross-section of the first fastening portion 34 is gradually decreased in size from the root portion to the end portion. The first inclined side 341 forms an outward-facing side of the first fastening portion 34.

Figure 3:
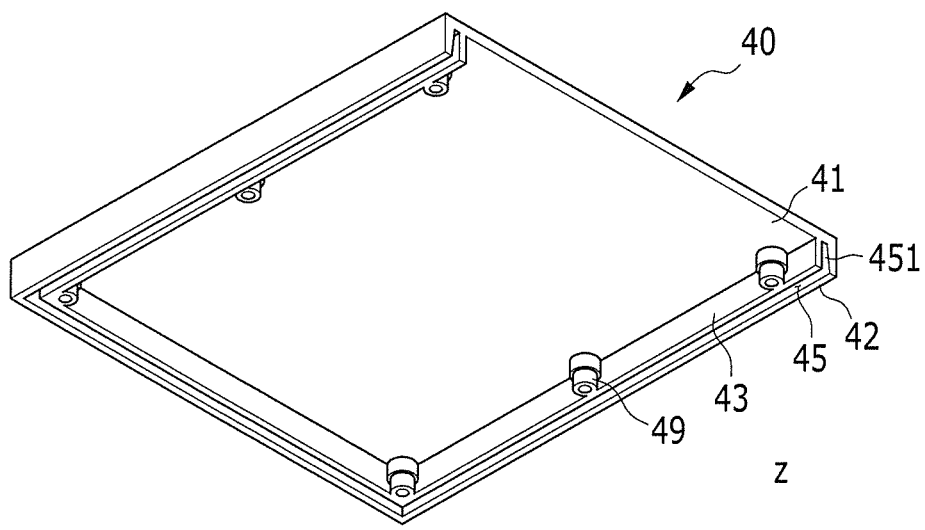
FIG. 3 is a cut-out perspective view of the cover according to the first embodiment of FIG. 1, viewed from the bottom thereof.

Referring to FIGS. 2 and 3, the cover 40 will be described. The cover 40 includes an upper plate 41, a first rib 42 protruding from a bottom surface of the upper plate 41 along a peripheral portion of the upper plate 41, and a second rib 43 protruding from the bottom surface of the upper plate 41, parallel to and separated from the first rib 42. A second fastening portion 45 is thus formed in the shape of a groove formed along a periphery of the cover 40 between the first rib 42 and the second rib 43.

The cover 40 seals the housing 30 by being combined thereto by the second fastening portion 45 being engaged with (or fitted to) the first fastening portion 34. A second inclined side 451 that is at an incline to the upper plate 41 forms the outer-most wall of the second fastening portion 45. A portion of the second fastening portion 45 farthest from the upper plate 41 is an entrance portion. The second fastening portion 45 meets the upper plate 41 at a bottom portion of the second fastening portion 45 (e.g., as one body). A cross-section of the second fastening portion 45 is gradually decreased in size from the entrance portion to the bottom portion.

The second inclined side 451 is configured to contact the first inclined side 341 of the first fastening portion 34, and the second inclined side 451 is steeper than the first inclined side 341. Thereby, the thickness of the end portion of the first fastening portion 34 is smaller than that of a portion of the second fastening portion 45 that contacts the end portion of the first fastening portion 34 when the first fastening portion and the second fastening portion are engaged. Further, the thickness of the root portion of the first fastening portion 34 is larger than that of the entrance portion of the second fastening portion 45.

Accordingly, when the first fastening portion 34 engages the second fastening portion 45, the root portion of the first fastening portion 34 may be tightly fitted to the entrance portion of the second fastening portion 45. As the first fastening portion 34 and the second fastening portion 45 are further inserted, the first and second fastening portions 34 and 45 are more tightly fitted so that a stronger stress is applied between the first and second fastening portions 34 and 45. Accordingly, sealing performance between the housing 30 and the cover 40 can be further improved.

In one embodiment, an elastic member 46 is provided between the first fastening portion 34 and the second fastening portion 45. For example, the elastic member is inserted into the second fastening portion 45. The elastic member 46 is formed in the shape of a ring extended along a direction where the second fastening portion 45 is formed. The elastic member 46 is formed from an elastic material including at least one material selected from a group consisting of natural rubber, silicon, polybutylene terephthalate (PBT), ethylene propylene diene monomer (EPDM), and polyamides.

The depth of the second fastening portion 45 is greater than the height of the first fastening portion 34, and the elastic member 46 fills a space between the first fastening portion 34 and the second fastening portion 45 when the first fastening portion is fully engaged with the second fastening portion. Since the elastic member 46 is deformed when the first fastening portion 34 and the second fastening portion 45 are combined, the elastic member 46 fills a space between the first inclined side 341 and the second inclined side 451. Accordingly, a firm seal can be made between the housing 30 and the cover 40.

Figure 4A:
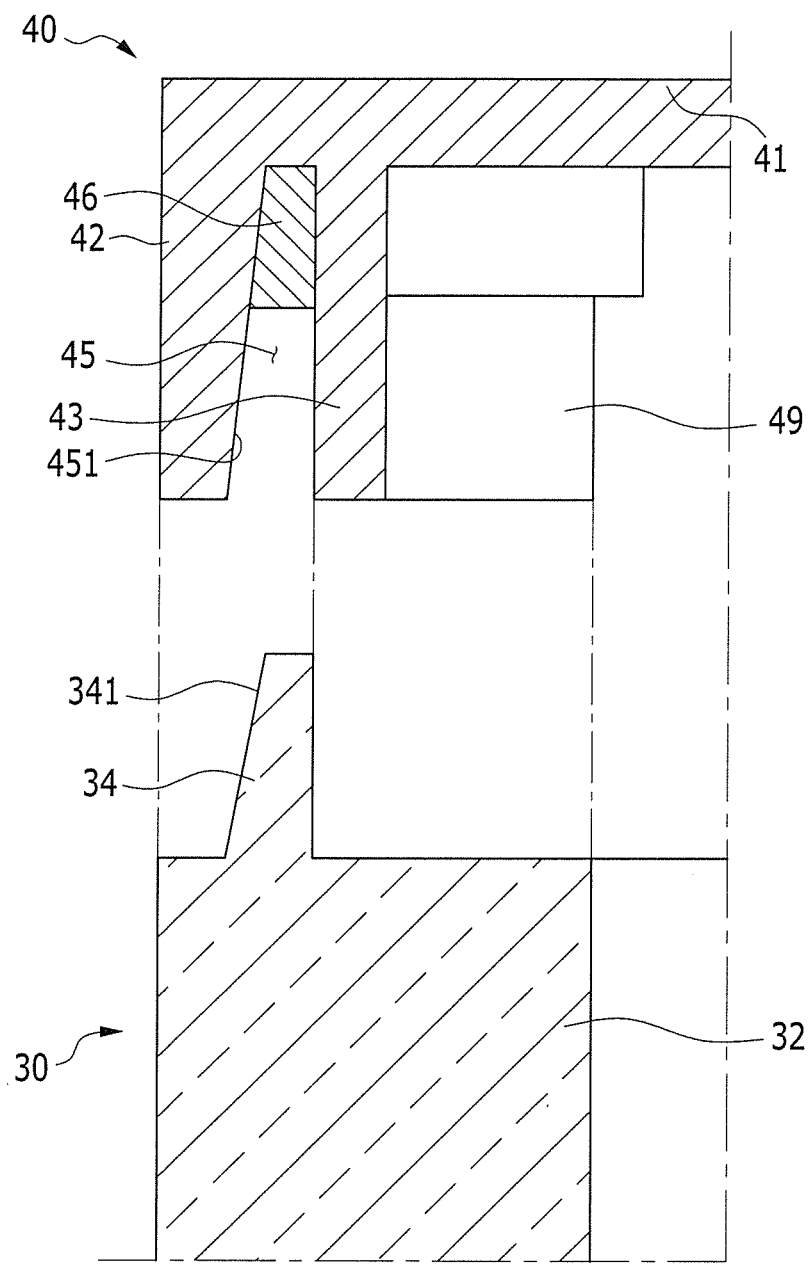
FIG. 4A is an exploded cross-sectional view of the housing and the cover according to the first embodiment of FIG. 1.
Figure 4B:
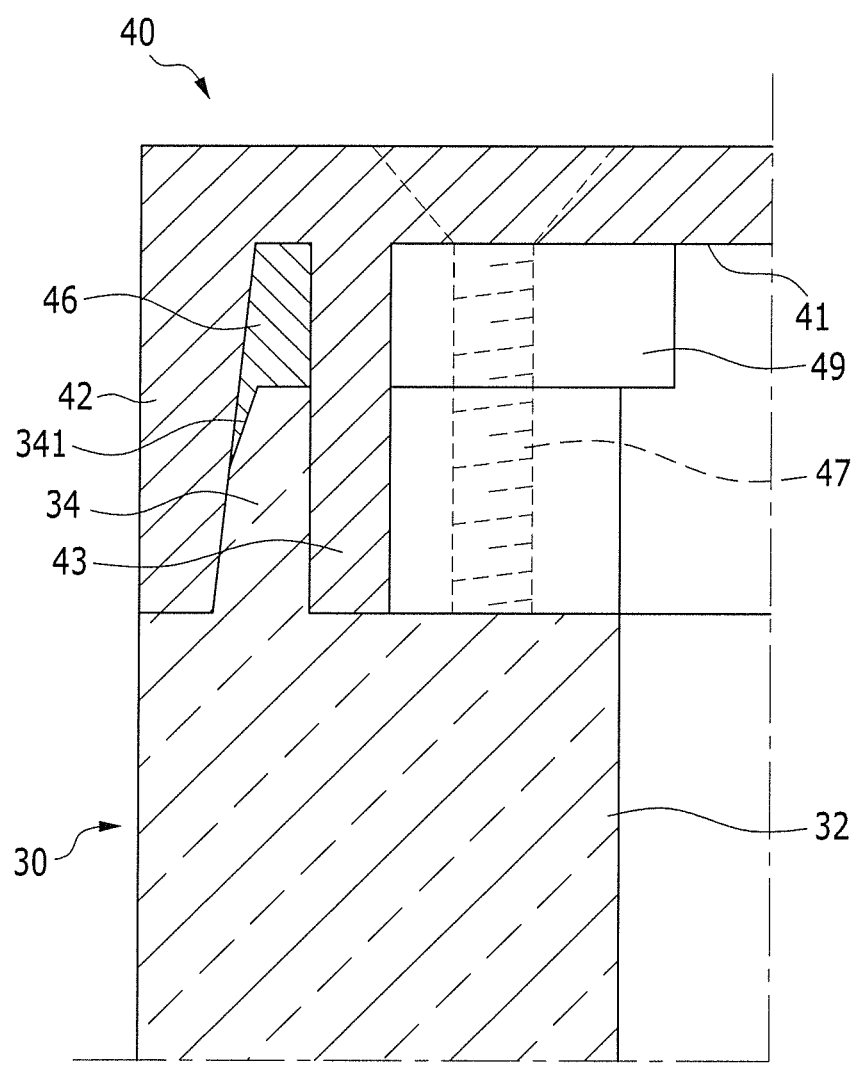
FIG. 4B is a partial cross-sectional view of the members shown in FIG. 4A in the combined state.

FIG. 4A is an exploded cross-sectional view of the housing 30 and the cover 40 according to the first embodiment of the present invention, and FIG. 4B is a partial cross-sectional view of the members shown in FIG. 4A in the combined state.

As shown in FIGS. 4A and 4B, since the cover 40 is pressured and fixed to the housing 30 by a pressing member 47, the first and second fastening portions 34 and 45 are engaged with each other in a tight-fitting manner when the cover 40 is pressed to the housing 30. Simultaneously or concurrently, the elastic member 46 is deformed and the root portion of the first fastening portion 34 is deformed and then further inserted into the second fastening portion 45. In one embodiment, the pressing member 47 is in the form of a screw inserted and fixed to the housing 30 through the cover 40. A boss 49 that guides the pressing member 47 is formed in the cover 40.

Accordingly, the space between the housing 30 and the cover 40 is sealed by the elastic member 46 filling the space between the first fastening portion 34 and the second fastening portion 45, and a tight fit between the root portion of the first fastening portion 34 and the entrance portion of the second fastening portion 45. Particularly, moisture cannot easily enter into the housing 30 because the first fastening portion 34 presses the elastic member 46 from below. As such, a path is extended due to an insertion structure between the first and second fastening portions so that moisture cannot enter into the housing 30.

Figure 5A:
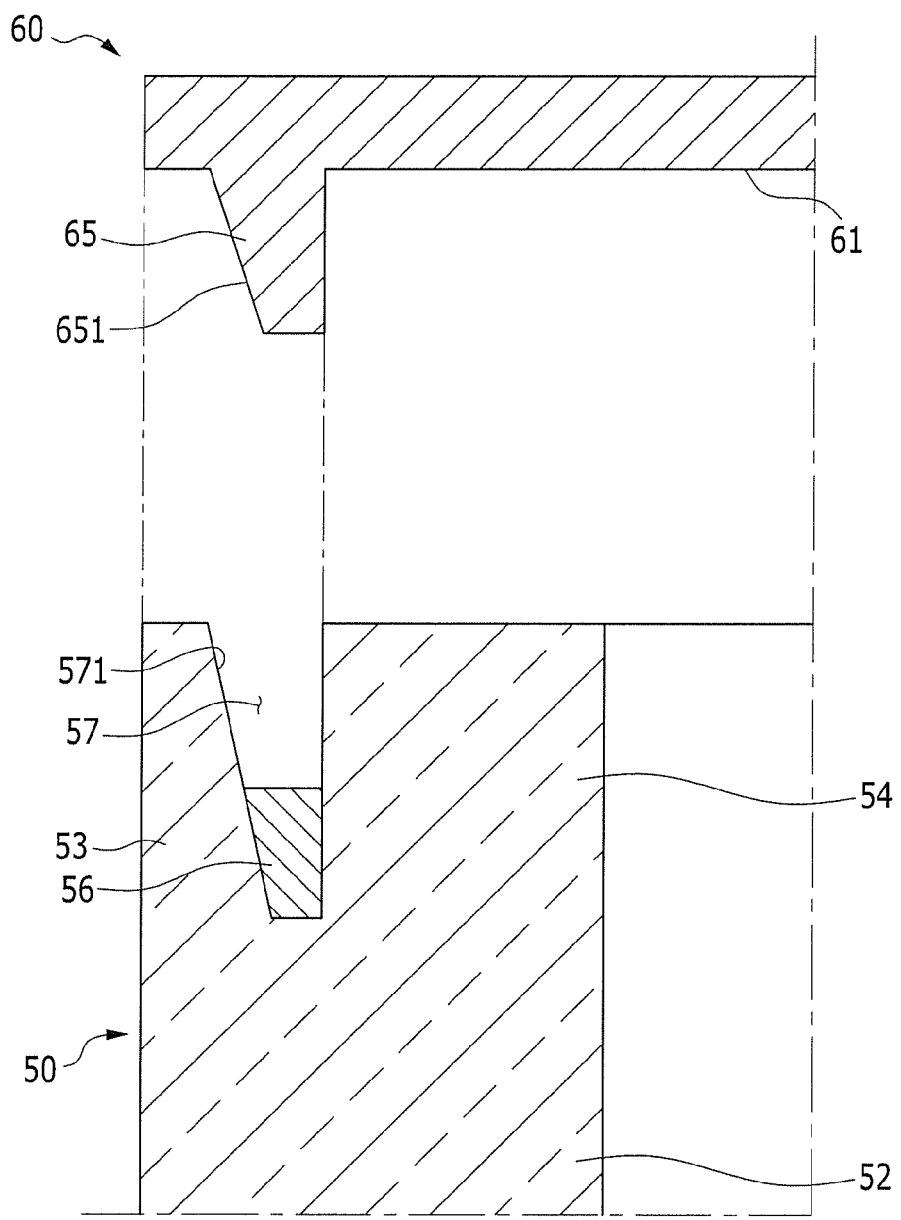
FIG. 5A is an exploded perspective view of a housing and a cover according to a second embodiment of the present invention.
Figure 5B:
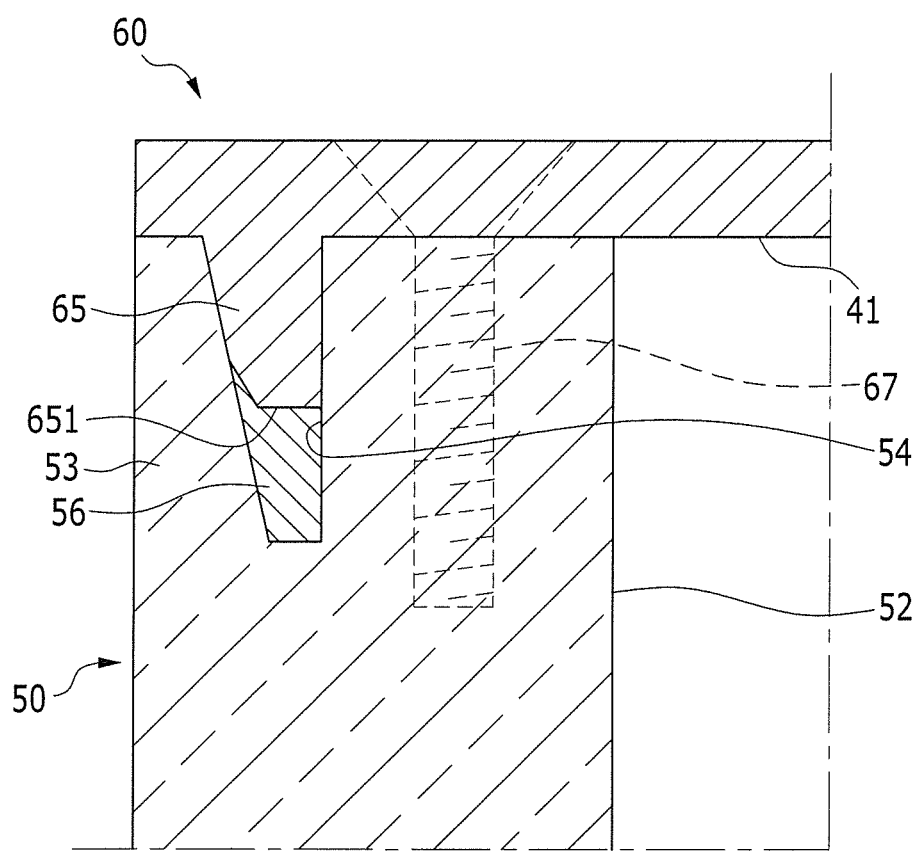
FIG. 5B is a partial cross-sectional view of the members shown in FIG. 5A in the combined state.

FIG. 5A is an exploded sectional view of a housing and a cover according to a second embodiment of the present invention, and FIG. 5B is a partial cross-sectional view of members shown in FIG. 5A, in the combined state.

Referring to FIGS. 5A and 5B, a battery module according to the second embodiment is substantially the same as that of the battery module of the first embodiment, excluding configurations of a housing 50 and a cover 60, and therefore a description for same structures will not be provided.

The housing 50 is formed in the shape of a rectangular prism and defines an inner space. A first fastening portion 57 formed in the shape of a groove is formed on (into) an upper edge (upper side) of a wall body 52. The first fastening portion 57 is formed between a first rib 53 and a second rib 54 at the upper edge (upper side) of the wall body 52, and is formed circumferentially along a periphery of the housing 50.

A first inclined side 571 at an incline to the upper side of the wall body 52 is formed in an outer-most wall of the first fastening portion 57. A portion of the first fastening portion 57 farthest from the wall body 52 is an entrance portion. The first fastening portion 57 meets the wall body 52 at a bottom portion of the first fastening portion 57. A cross-section of the first fastening portion 57 is gradually decreased from the entrance portion to the bottom portion.

The cover 60 is configured to combine with the housing 50. A second fastening portion 65 extends circumferentially along the periphery of a bottom surface of the cover 60. The second fastening portion 65 is formed in the shape of a protrusion, and is tightly fitted with the first fastening portion 57.

The cover 60 includes an upper plate 61 and the second fastening portion 65 formed in the shape of a protrusion that is extended circumferentially along the periphery of the upper plate 61 and protruded therefrom. A second inclined side 651 at an incline to the bottom surface of the upper plate 61 is formed in the second fastening portion 65. A portion of the second fastening portion 65 farthest from the upper plate 61 is an end portion. The second fastening portion 45 meets the upper plate 61 at a root portion of the second fastening portion 65 (e.g., as one body). A cross-section of the second fastening portion 65 is gradually decreased from the root portion to the end portion.

The second inclined side 651 is configured to contact the first inclined side 571 of the first fastening portion 57, and the slope of the second inclined side 651 is less steep than that of the first inclined side 571. Further, the root portion of the second fastening portion 65 is larger than the entrance portion of the first fastening portion 57. In addition, the end portion of the second fastening portion 65 is larger than the bottom of the first fastening portion 57.

Thus, when the first fastening portion 57 and the second fastening portion 65 are engaged with each other, the root portion of the second fastening portion 65 may be tightly fitted to the entrance portion of the first fastening portion such that a stronger stress is applied between the first and second fastening portions 57 and 65.

An elastic member 56 provided between the first and second fastening portions 57 and 65. In one embodiment, the elastic member 56 is inserted into the first fastening portion 57. The elastic member 56 is formed in the shape of a ring extended along a direction where the first fastening portion 57 is formed, and is formed with an elastic material. The depth of the first fastening portion 57 is greater than the height of the second fastening portion 65, and the elastic member 56 fills a space between the first fastening portion 57 and the second fastening portion 65 when the first fastening portion 57 and the second fastening portion 65 are engaged. Further, the thickness of a portion adjacent to the end portion of the second fastening portion 65 is smaller than the width of the first fastening portion 57 contacting same, and the thickness of the root portion of the second fastening portion 65 is larger than the width of the first fastening portion 57, contacting the same.

When the first fastening portion 57 and the second fastening portion 65 are engaged by inserting the second fastening portion 65 into the first fastening portion 57, the elastic member 56 is deformed and thus the deformed elastic member 56 is inserted into a space between the first and second inclined sides 571 and 651. Accordingly, a space between the housing 50 and the cover 60 can be stably sealed.

The cover 60 is pressed and fixed to the housing 50 by a pressing member 67. When the cover 60 is pressed to the housing 50, the first and second fastening portions 57 and 65 are coupled to each other by a tight fitting such that the elastic member 56 is pressed by the first fastening portion 57 and the root portion of the second fastening portion 65 is deformed and then inserted into the entrance portion of the first fastening portion 57.

As described, according to the second embodiment, the first fastening portion 57 and the second fastening portion 65 are sealed to each other by the tight fitting and the compressed elastic member 56 fills the space between the first fastening portion 57 and the second fastening portion 65 so that the space between the housing 50 and the cover 60 can be stably sealed.

Figure 6A:
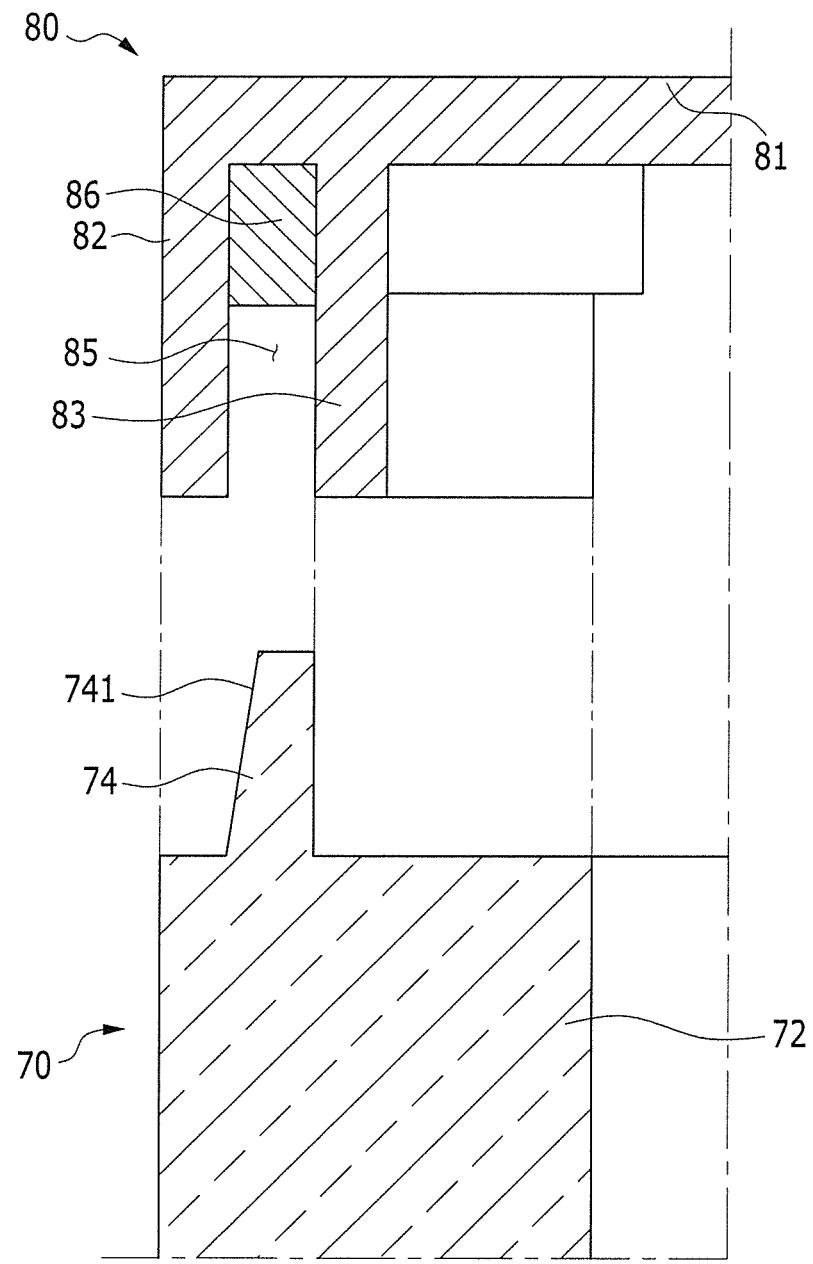
FIG. 6A is an exploded sectional view of a housing and a cover according to a third embodiment of the present invention.
Figure 6B:
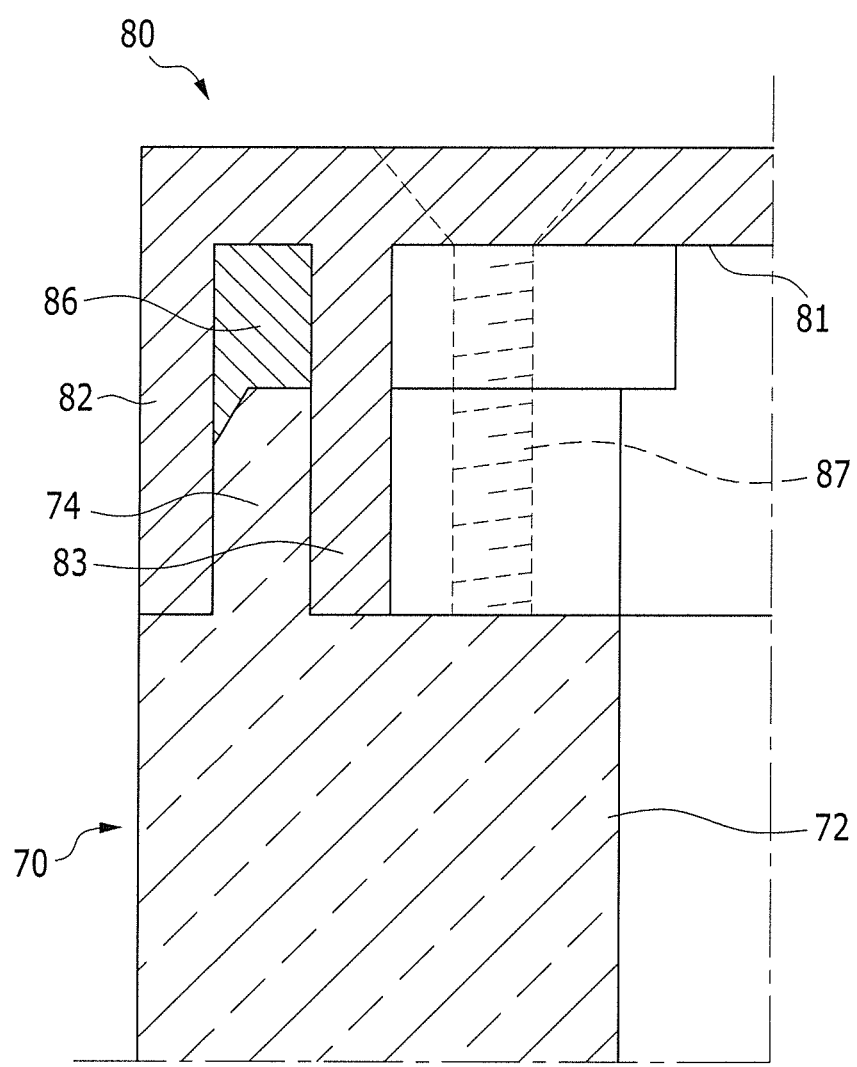
FIG. 6B is a partial cross-sectional view of the members shown in FIG. 6A in the combined state.

FIG. 6A is an exploded perspective view of a housing and a cover according to a third embodiment of the present invention, and FIG. 6B is a partial cross-sectional view of the members of FIG. 6A, in the combined state.

Referring to FIGS. 6A and 6B, a battery module according to the third embodiment is substantially the same as the battery module according to the first embodiment, excluding configurations of a housing 70 and a cover 80, and therefore a description for the same structures will not be provided.

The housing 70 is substantially formed in the shape of a rectangular prism and defines an inner space. A first fastening portion 74 formed in the shape of a protrusion is formed circumferentially along an upper edge of a wall body 72. The first fastening portion 74 joins the upper edge of the wall body 72 at a root portion. A portion of the first fastening portion 74 farthest from the wall body 72 is an end portion. An inclined side 741 formed at an incline to an inner side of a second fastening portion 85 is formed at a side of the first fastening portion 74 such that a cross-section of the inclined side 741 is gradually decreased toward the end portion thereof. In one embodiment, the inclined side 741 at an incline to the inner side of the second fastening portion 85, contacting the inclined side 741, forms an outward-facing side of the first fastening portion 74.

The cover 80 seals the housing 70 by being coupled to the housing, and the second fastening portion 85 that is coupled to the first fastening portion 74 by a tight fitting is formed in the cover 80. The second fastening portion 85 is formed in the shape of a groove, and formed along a periphery of the cover 80.

The cover 80 includes an upper plate 81, a first protruding rib 82 extended along the periphery of a bottom surface of the upper plate 81, and a second protruding rib 82 parallel to and separated from the first rib 82, such that the second fastening portion 85 is disposed between the first rib 82 and the second rib 83.

An inner side of the second fastening portion 85 is perpendicular to the upper plate 81. A portion of the second fastening portion 85 farthest from the upper plate 81 is an entrance portion. The second fastening portion 85 meets the upper plate 81 at a bottom portion of the second fastening portion 85 (e.g., as one body).

The root portion of the first fastening portion 74 is larger than the entrance portion of the second fastening portion. Accordingly, when the first and second fastening portions 74 and 85 are engaged with each other, the root portion of the first fastening portion 74 is coupled to the second fastening portion 85 by a tight fitting. In addition, the first fastening 74 is further closely sealed to the second fastening portion 85 as the first fastening portion 74 is deeply inserted into the second fastening portion 85, and a stress applied between the first and second fastening portions 74 and 85 is further increased.

An elastic member 86 is disposed between the first and second fastening portions 74 and 85. In one embodiment, the elastic member 86 is inserted into the second fastening portion 85. The elastic member 86 is extended in a direction to which the second fastening portion 85 is formed, and thus it has the shape of a ring. In one embodiment, the elastic member 86 is made of an elastic material. The depth of the second fastening portion 85 is larger than the height of the first fastening portion 74, and the elastic member 86 fills a space between the first and second fastening portions 74 and 85 when the first and second fastening portions are engaged.

In addition, a space between the inner side of the second fastening portion 85 and an inclined side 741 of the first fastening portion 74 is formed when the first and second portions are engaged, and the elastic member 86 is inserted into the spaced by being deformed. Accordingly, a space between the housing 70 and the cover 80 can be completely sealed.

The cover 80 is pressed and fixed to the housing 70 by a pressing member 87. When the cover 80 is pressed to the housing 70, the first and second fastening portions 74 and 85 are coupled to each other by a tight fitting such that the elastic member 86 is deformed by being pressed by the first fastening portion 74 and the lower portion of the second fastening portion 85, and then is inserted into the first fastening portion 74.

As described, according to the third embodiment, the first fastening portion 74 and the second fastening portion 85 are sealed to each other by the tight fitting and the compressed elastic member 86 fills the space between the first fastening portion 74 and the second fastening portion 85 so that the space between the housing 70 and the cover 80 can be stably sealed.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

<Description of certain symbols>

| | |
|---|---|
| 101: battery module | 20: rechargeable battery |
| 15: bus-bar | 21: positive terminal |
| 22: negative terminal | 27: vent member |
| 28: case | 30, 50, 70: housing |
| 31: bottom | 32, 52, 72: wall body |
| 34, 57, 74: first fastening portion | 341, 571: first inclined side |
| 40, 60, 80: cover | 41, 61, 81: upper plate |
| 42, 53, 82: first rib | 43, 54, 83: second rib |
| 45, 65, 85: second fastening portion | 451, 651: second inclined side |
| 46, 56, 86: elastic member | 47, 67, 87: pressing member |
| 741: inclined side | |

What is claimed is:

1. A battery module comprising:
    a plurality of rechargeable batteries;
    a housing configured to house the plurality rechargeable batteries and having a first fastening portion;
    a cover configured to couple to the housing and having a second fastening portion configured to couple to the first fastening portion by a fitting, the second fastening portion having a recess; and
    an elastic member configured to fit between the first and second fastening portions entirely within the recess.

2. The battery module of claim 1, wherein the first fastening portion is in the shape of a protrusion along an upper side of a wall body of the housing.

3. The battery module of claim 2, wherein the second fastening portion is formed in the shape of a groove, and wherein the first fastening portion has a first inclined side inclined to the upper side of the wall body.

4. The battery module of claim 3, wherein the second fastening portion has a second inclined side contacting and inclined to the first inclined side, and the second inclined side has an incline angle that is greater than that of the first inclined side.

5. The battery module of claim 4, wherein the elastic member is configured to be inserted between the first and second inclined sides.

6. The battery module of claim 2, wherein the first fastening portion has an inclined side inclined to an inner side of the second fastening portion.

7. The battery module of claim 6, wherein the second fastening portion is formed in the shape of a groove, and
wherein a root portion of the first fastening portion is larger than an entrance portion of the second fastening portion.

8. The battery module of claim 1, wherein the first fastening portion is formed in the shape of a groove.

9. The battery module of claim 8, wherein the second fastening portion is formed in the shape of a protrusion along an upper side of a wall body of the housing, and
wherein a cross-section of the second fastening portion is gradually increased toward the wall body of the housing.

10. The battery module of claim 8, wherein the second fastening portion has a cross-section that is gradually decreased toward the cover.

11. The battery module of claim 8, wherein the second fastening portion has an inclined side inclined to an inner side of the first fastening portion.

12. The battery module of claim 11, wherein the elastic member is inserted between the inner side and the inclined side of the first fastening portion and the inclined side of the second fastening portion.

13. The battery module of claim 1, wherein the first fastening portion is formed along a circumference of the housing.

14. The battery module of claim 13, wherein the second fastening portion is formed along a circumference of the cover.

15. The battery module of claim 13, further comprising a pressing member configured to press the cover to the housing.

16. The battery module of claim 1, wherein the first fastening portion and the second fastening portion are configured to be couple to each other by a tight fitting.

17. The battery module of claim 1, wherein the elastic member comprises a material selected from the group consisting of natural rubber, silicon, polybutylene terephthalate (PBT), ethylene propylene diene monomer (EPDM), and polyamides.

* * * * *